(12) United States Patent
Ting et al.

(10) Patent No.: US 7,728,915 B2
(45) Date of Patent: Jun. 1, 2010

(54) PIXEL STRUCTURE AND PIXEL STRUCTURE OF DISPLAY APPARATUS

(75) Inventors: Yu-Hsin Ting, Hsin-Chu (TW); Ya-Chun Lee, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 445 days.

(21) Appl. No.: 11/802,347

(22) Filed: May 22, 2007

(65) Prior Publication Data

US 2008/0100761 A1   May 1, 2008

(30) Foreign Application Priority Data

Oct. 31, 2006   (TW) .............................. 95140317 A

(51) Int. Cl.
*G02F 1/1343* (2006.01)
(52) U.S. Cl. ............................. 349/38; 349/39; 349/147
(58) Field of Classification Search ................... 349/38, 349/39
See application file for complete search history.

(56) References Cited

U.S. PATENT DOCUMENTS

| 6,335,770 | B1 | 1/2002 | Komatsu |
| 2003/0071930 | A1* | 4/2003 | Nagahiro ................... 349/39 |
| 2005/0190312 | A1 | 9/2005 | Yang |
| 2006/0028592 | A1 | 2/2006 | Lai |
| 2006/0050191 | A1 | 3/2006 | Park et al. |
| 2006/0061701 | A1 | 3/2006 | Chang |
| 2006/0119753 | A1* | 6/2006 | Luo et al. ................... 349/38 |
| 2007/0103610 | A1* | 5/2007 | Lee et al. ................... 349/38 |
| 2008/0239183 | A1* | 10/2008 | Luo et al. ................... 349/39 |

FOREIGN PATENT DOCUMENTS

JP   2625268   4/1997

\* cited by examiner

*Primary Examiner*—Michelle R Connelly Cushwa
(74) *Attorney, Agent, or Firm*—Rabin & Berdo, PC

(57) ABSTRACT

A pixel structure of the present invention includes two metal plates and a transistor. The metal plates are electrically connected together. The gate of the transistor receives a scan signal. The drain of the transistor receives a data signal. The source of the transistor includes two extending portions. A store capacitor is formed between the two extending portions and the two metal plates. The two extending portions are plate structures.

11 Claims, 4 Drawing Sheets

PIXEL STRUCTURE AND PIXEL STRUCTURE OF DISPLAY APPARATUS

This application claims the benefit of Taiwan Patent Application Serial No. 095140317, filed Oct. 31, 2006, the subject matter of which is incorporated herein by reference.

BACKGROUND OF THE INVENTION

1. Field of the Invention

The invention relates in general to a pixel structure of a display apparatus, and more particularly to a pixel structure with a storage capacitor formed by coupling two metal plates.

2. Description of the Related Art

FIG. 1A illustrates part of a conventional pixel structure in a display panel. A pixel 100 is controlled by a scan line SC1 and receives a data signal transmitted from a data line DT1. FIG. 1B is a cross-sectional view of the pixel 100 in FIG. 1A taken along a line A1-B1-C1.

As shown in FIG. 1B, a pixel structure of the pixel 100 includes an indium tin oxide (ITO) layer, a passivation layer, two metal plates, an interlayer dielectric (ILD) layer, an oxide layer and a polysilicon layer. The pixel 100 includes a transistor 110 and storage capacitors Cp1 and Cp2. A gate of the transistor 110 is formed by a polysilicon area 160 to receive a signal of the scan line SC1. A drain of the transistor 110 is connected to a metal plate 130b. The metal plate 130b receives a data signal of the data line DT1. A source of the transistor 110 is formed by a doped polysilicon layer 150 and connected to a metal plate 130a. The metal plate 130a is connected to the ITO layer 120. A metal plate 140 is located between the metal plate 130a and the doped polysilicon layer 150 for receiving common voltage Vcom1.

The voltage of the metal plate 130a is the same as the voltage of the doped polysilicon layer 150. The storage capacitor Cp1 is formed by the metal plate 130a and the metal plate 140. The storage capacitor Cp2 is formed by the metal plate 140 and the doped polysilicon layer 150. When the scan line SC1 is enabled, pixel voltage related to the data signal of the data line DT1 is stored in the storage capacitors Cp1 and Cp2.

However, because metal particles often remain between the metal plates 130a and 140 due to manufacturing problems, a short circuit occurs between the metals 130a and 140 accidentally. As a result, the storage capacitor Cp1 between the metal plates 130a and 140 disappears, which causes a bright spot in the pixel 100.

SUMMARY OF THE INVENTION

The invention is directed to a pixel structure. Two metal plates used for generating a storage capacitor are connected together to form the storage capacitor over or under the two metal plates. Therefore, even metal particles are generated between the two metal plates due to manufacturing problems, the storage capacitor of the pixel structure is not affected thereby. The yield rate of the manufacturing process is hence increased.

According to the present invention, a pixel structure for use in a display apparatus includes a first metal plate, a second metal plate, a transistor and a storage capacitor. The second metal plate is connected to the first metal plate. A gate of the transistor receives a scan signal. A first electrode of the transistor receives a data signal. A second electrode of the transistor includes two extending portions. The extending portions are plate structures. A storage capacitor is formed by the two extending portions and the two metal plates.

According to the present invention, a pixel structure of a liquid crystal display includes a first metal plate, a second metal plate, a transistor and a storage capacitor. The first and the second metal plates are electrically connected together. The transistor includes a gate, a first electrode, and a second electrode. The gate is for receiving a scan signal. The first electrode is for receiving a data signal. The second electrode includes a first extending portion and a second extending portion. A storage capacitor is formed by the first extending portion, the second extending portion, the first metal plate and the second metal plate.

The invention will become apparent from the following detailed description of the preferred but non-limiting embodiments. The following description is made with reference to the accompanying drawings.

DETAILED DESCRIPTION OF THE INVENTION

A pixel structure of the present invention includes two metal plates and a transistor. The metal plates are electrically connected to each other. A gate of the transistor receives a scan signal, and a drain of the transistor receives a data signal. A source of the transistor includes two extending portions. A storage capacitor is formed between the extending portions and the metal plates. The extending portions are plate structures.

Figure 1A:
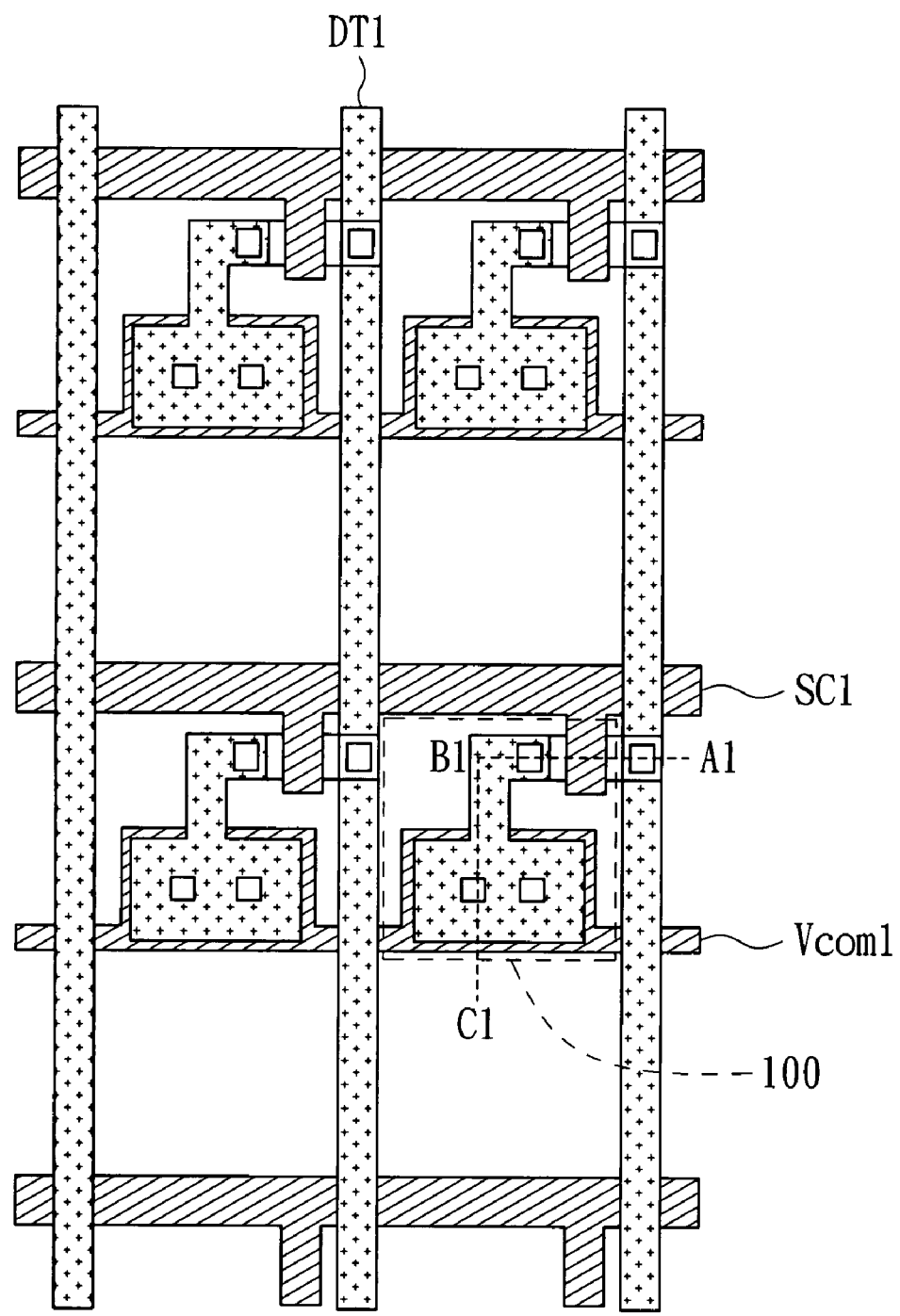
FIG. 1A illustrates part of a conventional display panel.
Figure 1B:
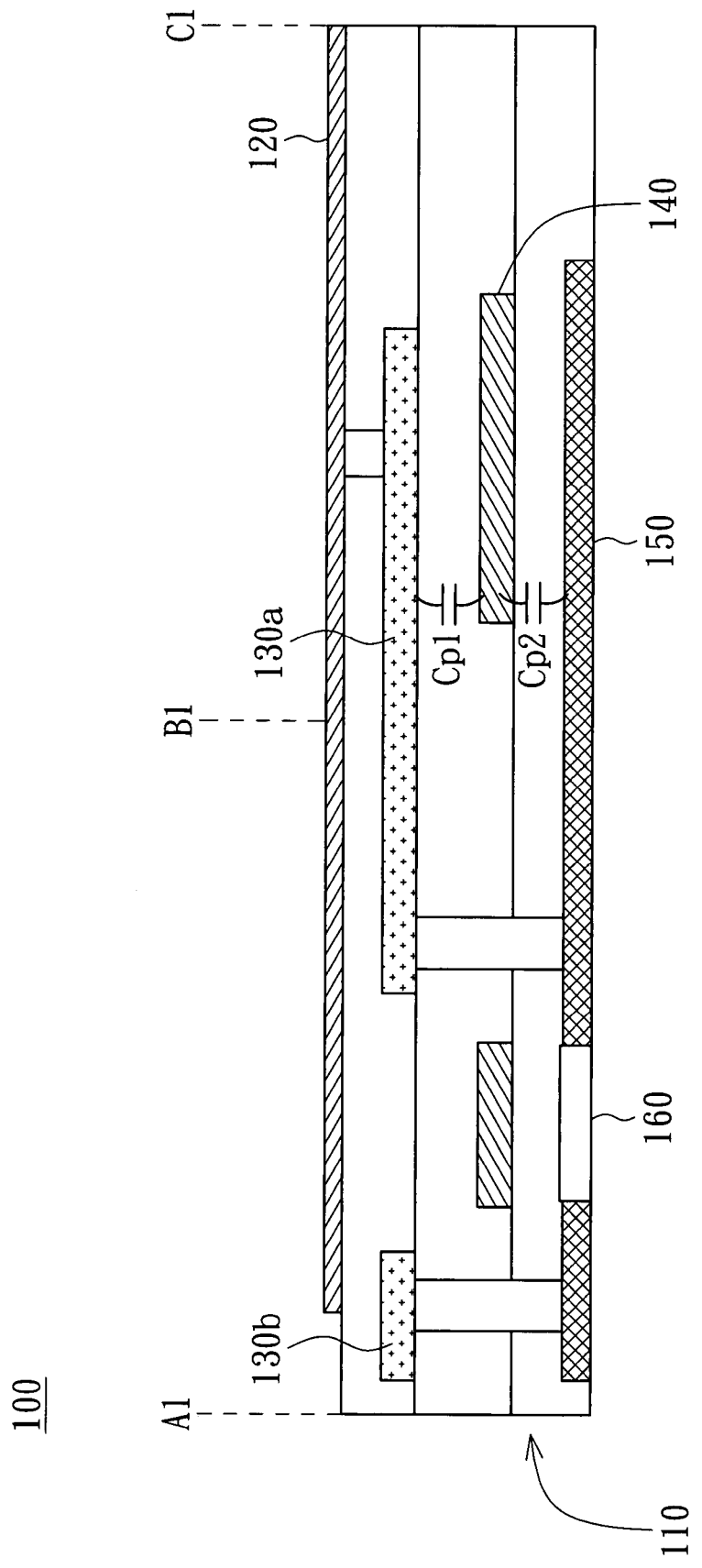
FIG. 1B is a cross-sectional view of conventional pixel.
Figure 2A:
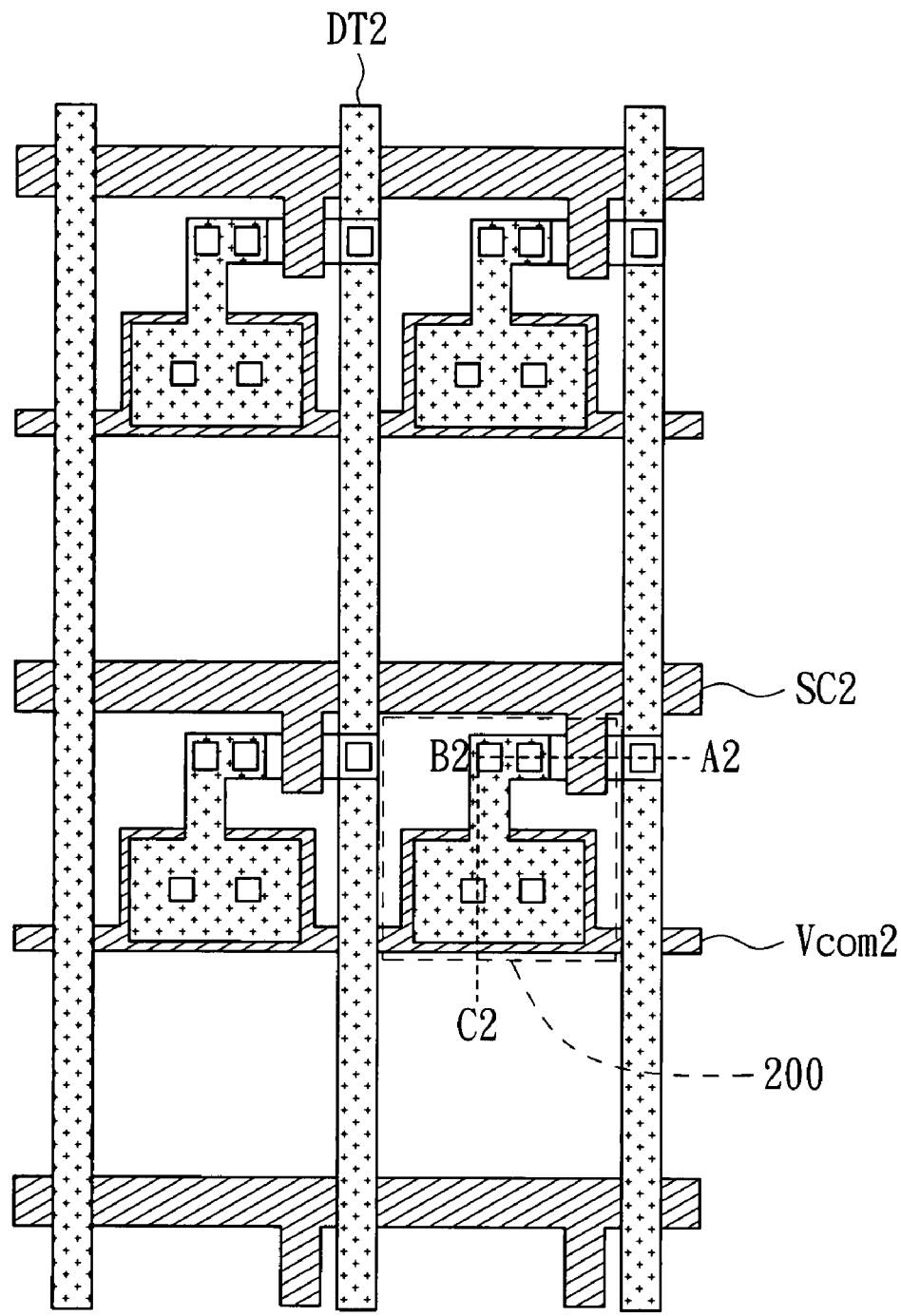
FIG. 2A illustrates part of a display panel formed by a pixel including the pixel structure of a preferred embodiment of the present invention.
Figure 2B:
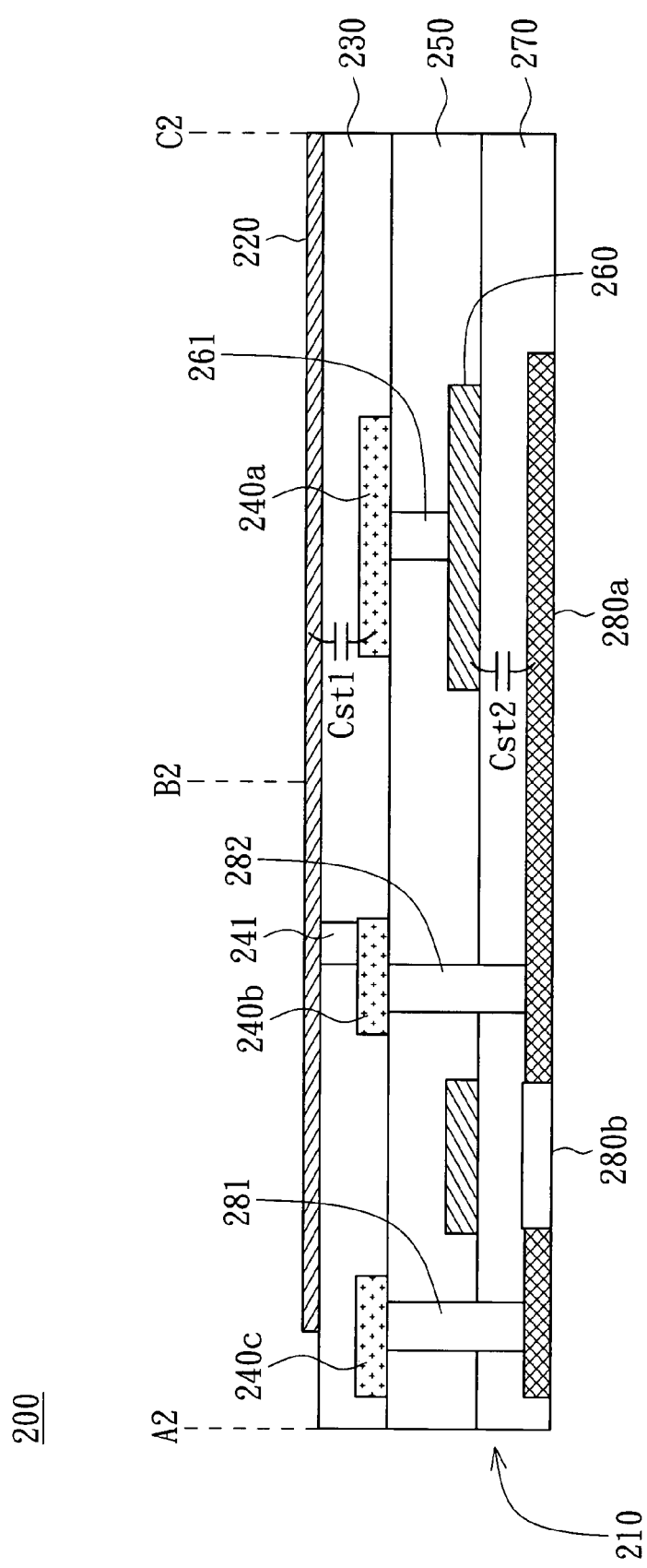
FIG. 2B is a cross-sectional view of the pixel structure according to the preferred embodiment of the invention.

FIG. 2A illustrates part of a display panel formed by a pixel including the pixel structure of a preferred embodiment of the present invention. The pixel 200 includes the pixel structure of the present embodiment. The pixel 200 is controlled by a scan line SC2 and receives a data signal transmitted from a data line DT2. FIG. 2B is a cross-sectional view of the pixel structure in FIG. 2A along a line A2-B2-C2.

As shown in FIG. 2B, the pixel structure of the present embodiment includes an ITO layer 220, a passivation layer 230, a first metal layer, a second metal layer, an interlayer dielectric (ILD) layer 250, an oxide layer 270 and a polysilicon layer from top to bottom. The ITO layer 220 is a transparent electrode for example.

The pixel 200 includes a transistor 210 and storage capacitors Cst1 and Cst2. The gate of the transistor 210 is formed by a polysilicon area 280b and receives a signal of the scan line SC2. The drain of the transistor 210 is connected to a metal plate 240c through a via 281. The metal plate 240c receives a data signal transmitted from the data line DT2. The source of the transistor 210 is formed by a doped polysilicon layer 280a and connected to a metal plate 240b through a via 282. The doped polysilicon layer 280a is a extending portion of the source of the transistor 210. The polysilicon area 280b and the doped polysilicon layer 280a are formed by the polysilicon layer. The metal plates 240b and 240c are formed by the first metal layer.

The metal plate 240b is connected to the ITO layer 220 through a via 241, so that the ITO layer 220 is another extending portion of the source of the transistor 210. The first metal layer further forms a metal plate 240a. The metal plate 240a is electrically isolated from the metal plate 240b. A metal plate 260 is located between the metal plate 240a and the doped polysilicon layer 280a. Also, the metal plate 260 is electrically connected to the metal plate 240a for receiving the common voltage Vcom2. The metal plate 260 is formed by the second metal layer. The passivation layer 230 is formed between the ITO layer 220 and the first metal layer. The ILD layer 250 is formed between the first metal layer and the second metal layer. The oxide layer 270 is formed between the second metal layer and the polysilicon layer.

Because the passivation layer 230 is formed between the ITO layer 220 and the metal plate 240a, the storage capacitor Cst1 is formed by the ITO layer 220 and the metal plate 240a. Similarly, because the oxide layer 270 is between the metal plate 260 and the doped polysilicon layer 280a, the storage capacitor Cst2 is formed by the metal plate 260 and the doped polysilicon layer 280a. The ITO layer 220 and the doped polysilicon layer 280a are coupled with the source of the transistor 210, and the metal plates 240a and 260 both receive the common voltage Vcom2. Therefore, when a data signal of the data line DT2 is transmitted to the metal plate 240c, pixel voltage related to the data signal is stored in the storage capacitors Cst1 and Cst2.

In the pixel 200 in FIG. 2B, the metal plates 240a and 260 are electrically connected to each other. Therefore, even when these two metal plates are electrically connected together due to metal particles generated between these two metal plates, the storage capacitors Cst1 and Cst2 are not affected thereby. When the data line DT2 transmits a data signal to the pixel 200, the pixel voltage related to the data signal is stored in the storage capacitors Cst1 and Cst2 correctly. Hence, the two metal plates used for generating the storage capacitors are electrically connected together in the pixel structure according to the embodiment of the present invention. The storage capacitors are formed between the ITO layer, the two metal plates and the doped polysilicon layer, so that the storage capacitors are not affected by metal particles between the two metal plates.

Furthermore, the passivation layer 230 in the pixel structure of the embodiment is thinner than that of a conventional pixel structure. The storage capacitor Cst1 formed between the ITO layer 220 and the metal plate 240a is larger. Therefore, the capacitor area is reduced, and aperture ratio is increased.

In the embodiment of the pixel, the metal plates 240a, 240b and 240c are formed by the first metal layer as an example. Practically, the metal layer forming the metal plate 240a and the metal layer forming metal plate coupled with the drain and the source of the transistor can be different.

In the pixel structure of the embodiment, the extending portions of the source of the transistor are exemplified by the ITO layer and the doped polysilicon layer, which respectively form a storage capacitor with one of the two electrical-coupled metal plates. Practically, the extending portions of the source of the transistor in the pixel structure of the present invention are not limited thereto. The present invention encompasses any pixel structure including a transistor and two metal plates electrically connected together, and forming storage capacitors with the two extending portions of the source of the transistor.

In the pixel structure of the present invention, the two metal plates used for generating storage capacitors are electrically connected together, and the storage capacitors are formed by the metal plates and extending portions of the source of the transistor. Therefore, even metal particles are generated between the two metal plates due to manufacturing problems; the storage capacitors of the pixel structure are not affected. The yield rate of the manufacturing process is increased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pixel structure for use in a display apparatus, the pixel structure comprising:
    a first metal plate formed by a first metal layer;
    a second metal plate formed by a second metal layer different from the first metal layer, the second metal plate being electrically connected to the first metal plate; and
    a transistor having a gate for receiving a scan signal, a first electrode for receiving a data signal, and a second electrode comprising first and second extending portions, the extending portions being plate structures; and
    a storage capacitor formed by the extending portions, and the metal plates.

2. The pixel structure according to claim 1, wherein a first end of the second electrode and a second end of the second electrode are respectively electrically connected to a first extending portion and a second extending portion.

3. The pixel structure according to claim 1, wherein the storage capacitor comprises a first storage capacitor and a second storage capacitor, the first storage capacitor is formed by the first metal plate and the first extending portion, the second storage capacitor is formed by the second metal plate and the second extending portion.

4. The pixel structure according to claim 1, wherein the extending portion of the second electrode comprises an indium tin oxide (ITO) layer.

5. The pixel structure according to claim 1, wherein the extending portion of the second electrode comprises a doped polysilicon layer.

6. The pixel structure according to claim 1, wherein the first metal plate and the second metal plate receive a common voltage.

7. The pixel structure according to claim 1, further comprising a passivation layer formed between the first metal plate and the second metal plate, wherein the first metal plate is electrically connected to the second metal plate through a via.

8. The pixel structure according to claim 7, wherein the passivation layer comprises an interlayer dielectric (ILD) layer.

9. A pixel structure of a liquid crystal display, the pixel structure comprising:
    a first metal plate formed by a first metal layer;
    a second metal plate formed by a second metal layer different from the first metal layer, the second metal plate being electrically connected to the first metal plate;
    a transistor comprising:
        a gate for receiving a scan signal;
        a first electrode for receiving a data signal; and
        a second electrode comprising a first extending portion and a second extending portion; and
    a storage capacitor comprising a first storage capacitor and a second storage capacitor, wherein the first storage capacitor is formed by the first extending portion and the first metal plate, and the second storage capacitor is formed by the second extending portion and the second metal plate.

10. The pixel structure according to claim 9, wherein the first extending portion comprises an indium tin oxide (ITO) layer, the second extending portion comprises a doped polysilicon layer, and the first extending portion is electrically connected to the second extending portion through a via.

11. The pixel structure according to claim 9, wherein the first extending portion comprises a transparent electrode.

* * * * *